United States Patent [19]
Nakamura

[11] Patent Number: 5,109,191
[45] Date of Patent: Apr. 28, 1992

[54] TACHOMETER SYSTEM FOR ENGINE HAVING BATTERY OR MAGNETO POWERED IGNITION SYSTEM

[75] Inventor: Kazuhiro Nakamura, Hamamatsu, Japan

[73] Assignee: Sanshin Kogyo Kabushiki Kaisha, Hamamatsu, Japan

[21] Appl. No.: 502,543

[22] Filed: Mar. 30, 1990

[30] Foreign Application Priority Data

Mar. 31, 1989 [JP] Japan .................................... 1-78305

[51] Int. Cl.⁵ .......................... G01P 3/42; G01P 3/48; G01P 3/54
[52] U.S. Cl. .................................... 324/160; 324/166
[58] Field of Search .............. 324/173, 174, 160, 166, 324/168, 169, 170; 328/260, 264, 267; 307/66; 361/240

[56] References Cited

U.S. PATENT DOCUMENTS 3,881,094 4/1975 Taylor et al.
4,127,812 11/1978 Baliquet .............................. 324/174
4,486,759 12/1984 Toyomura ........................... 307/66

Primary Examiner—Walter E. Snow
Attorney, Agent, or Firm—Ernest A. Beutler

[57] ABSTRACT

Two embodiments of tachometers for engines that are capable of use with an engine that either has an external source of electrical power such as a battery or no external source of power. In one embodiment, the switching is accomplished manually and in another embodiment the switching is accomplished automatically whenever battery power is applied to the tachometer. A constant voltage system reduces noise generated by this system.

5 Claims, 2 Drawing Sheets

5,109,191

TACHOMETER SYSTEM FOR ENGINE HAVING BATTERY OR MAGNETO POWERED IGNITION SYSTEM

BACKGROUND OF THE INVENTION

This invention relates to a tachometer system for an engine and more particularly to a tachometer that can be utilized with engines which have associated with them a separate power source such as a battery or wherein the engine has no such associated separate electrical power source.

Basically, tachometers may be considered to fall into two general types. The first type of tachometer is employed in applications wherein there is a separate source of electrical power such as a battery. This source of electrical power is supplied to the tachometer. The tachometer receives pulsating signals from the engine indicative of speed either from the ignition system or from its generating system and these signals are converted into a display indicative of engine speed.

With types of engines that do not have separate electrical power sources, then the magneto generator not only provides the speed detection signal but also the power for operating the tachometer. However, this type of device can cause a problem with the other electrical circuits of the engine due to the fact that the pulsating output signals have a high voltage and hence can generate noise that can adversely effect other electrical systems.

It is, therefore, a principal object of this invention to provide an improved and simplified tachometer for engines that can be utilized with both engines having separate electrical power sources and those having no separate electrical power source.

It is a further object of this invention to provide an improved and simplified tachometer that is capable of use in a wide variety of types of installations and which will not introduce external noise into the system.

SUMMARY OF THE INVENTION

This invention is adapted to be embodied in a tachometer system for an internal combustion engine which tachometer is adapted to be powered either by the battery or a coil of the engine ignition or generating system. The system includes a signal detecting circuit portion for receiving signals from the engine to provide an engine speed signal. A speed indicating circuit portion is further provided for receiving the engine speed signal and providing an engine speed indication. A constant voltage portion is provided for providing a source of constant voltage at at least one of these circuit portions. Switch means are provided for selectively coupling the constant voltage portion to the generating coil when the system is not powered by a battery or to a battery if available.

DETAILED DESCRIPTION OF THE PREFERRED EMBODIMENTS OF THE INVENTION

Figure 1:
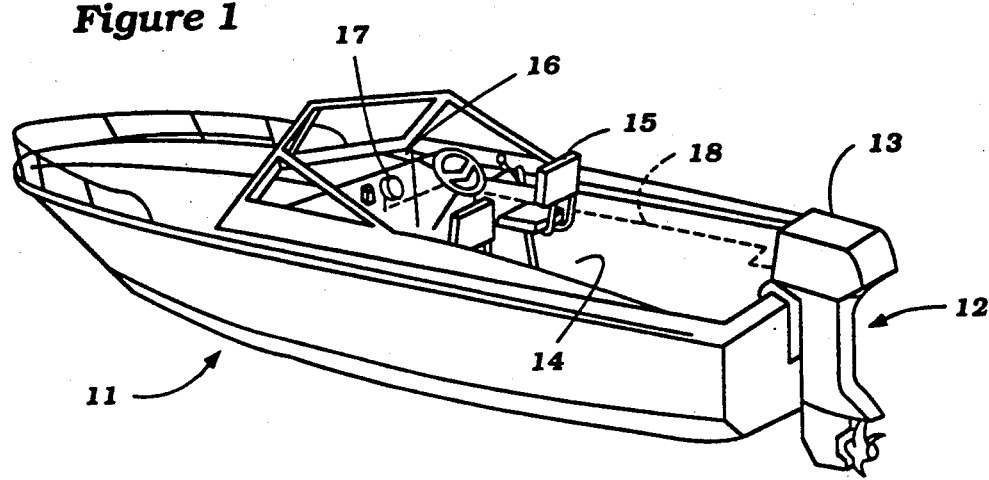
FIG. 1 is a perspective view of a watercraft having a tachometer system constructed in accordance with an embodiment of the invention.

Referring first to FIG. 1, a watercraft having a tachometer system constructed in accordance with an embodiment of the invention is identified by the reference numeral 11. Although the invention is described in conjunction with the watercraft 11, it is to be understood that the invention has other applications. In fact, the versatility of the tachometer system lends itself to a wide variety of applications, but marine usage is a very practical application for the invention since marine systems may include engines that have generating coils and batteries or engines that do not have separate electrical power.

The watercraft 11 has an outboard motor, indicated generally by the reference numeral 12, mounted on its transom that includes a power head 13 having an internal combustion engine that includes a generating coil which may be either a coil of the capacitor discharge ignition system or a coil for charging a separate battery. The term "generating coil" is used in this specification and claims generically so as to cover all such types of generating coils.

The watercraft 11 is provided with a passenger or rider's compartment 14 in which an operator's seat 15 is positioned. A control panel 16 is positioned forwardly of the rider's seat 15 and mounts a variety of instruments including a tachometer 17 that receives a signal from the engine of the power head 13 via a conductor 18.

Figure 2:
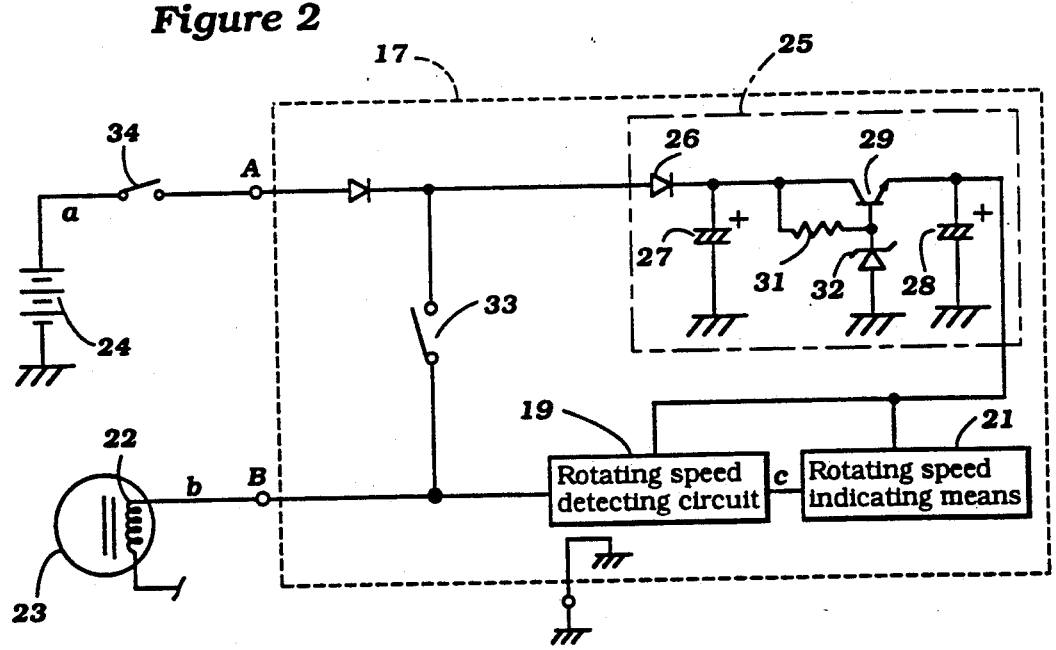
FIG. 2 is a schematic electrical diagram of the tachometer system and its association with the engine of this embodiment.

Referring now in detail to FIG. 2, it will be noted that the tachometer 17 includes a rotating speed detecting circuit 19 that outputs a signal c to an engine speed indicating device 21 that displays the engine speed to the operator. The speed detector 17 has a junction B that receives an input signal b from a generator coil 22 of a generator 23 driven by the engine of the outboard motor 12. As has been previously noted, the coil 22 can be either a generating coil for charging an electrical battery such as a battery, indicated at 24, or may be the charging coil of an SCR ignition system or may be the pulser coil of such an ignition system.

The generating coil 22 supplies, in either application for the tachometer 17 to a system with or without an external power source such as a battery a signal which is indicative of engine speed. However, power is actually supplied to both the speed detecting circuit portion 19 and the indicating portion 21 from a constant voltage power source, indicated generally by the reference numeral 25. This power source includes a diode 26, a pair of capacitors 27 and 28 and a switching circuit including an SCR 29, a resistor 31 and a protecting ziener diode 32. When an external battery is not available, an operator controlled switch 33 is closed so that the coil 22 also supplies power to the constant voltage circuit 25 so as to provide the power source for the speed detecting circuit portion 19 and the indicating circuit portion 21.

The tachometer 17 has a further junction A that is adapted to be connected to the battery 24 if one if available through a main switch 34. When battery power is available, then the switch 33 is left open and the battery itself provides the power through the circuit 25 to the speed detecting circuit portion 19 and the indicating circuit portion 21 for their power.

Figure 3:
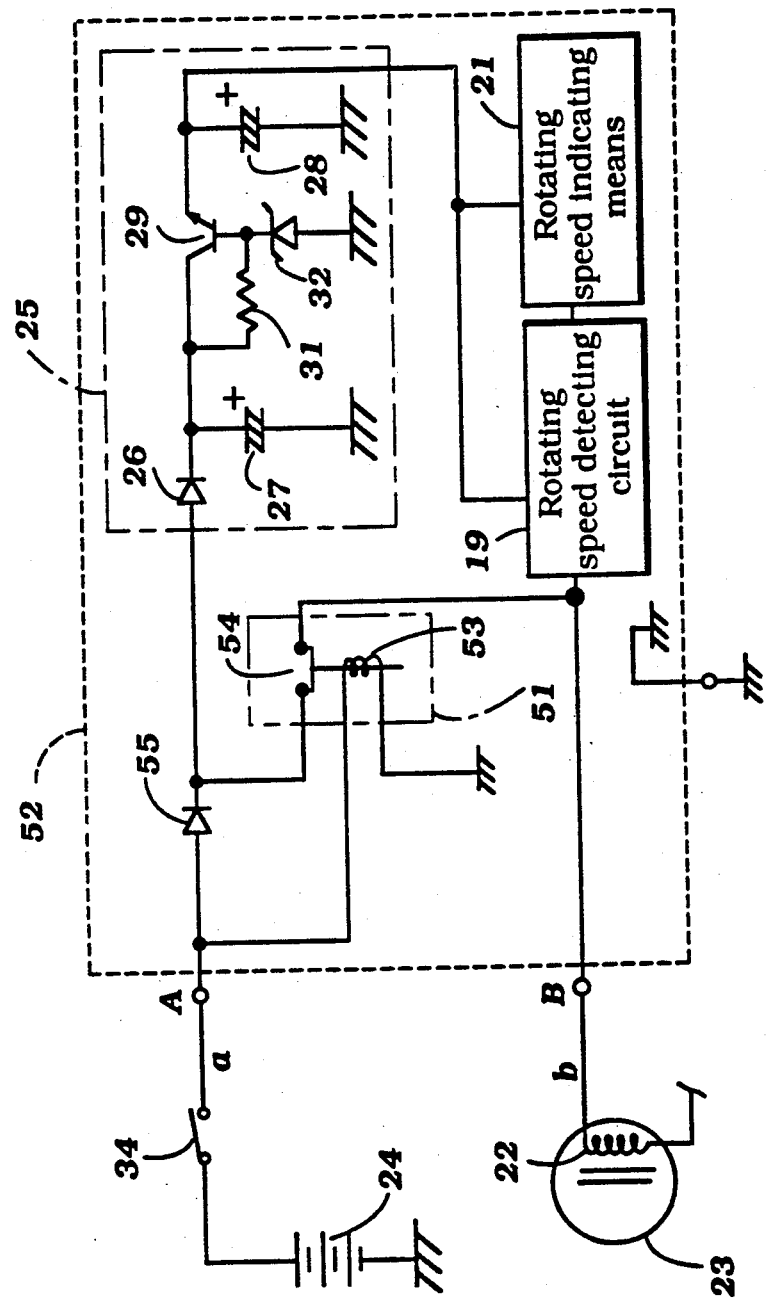
FIG. 3 is a schematic electrical diagram of another embodiment of the invention.

FIG. 3 shows another embodiment of the invention which is generally similar to the embodiment of FIG. 2 and, for that reason, components which are the same have been identified by the same reference numerals. In this embodiment, however, the manually operated switch 33 is dispensed with and the system employs a relay switch, indicated generally by the reference numeral 51 which is operative to automatically uncouple the connection between the generating coil 22 and the constant voltage supply circuit 25 when a battery is connected to the terminal A of the speed indicator, indicated in this instance by the reference numeral 52.

The solenoid switch 51 is a normally closed switch so that when no power is applied to its winding 53 the terminal 54 will be closed. However, when the battery 24 is connected and the main switch 34 is closed, the winding 53 will be energized and the terminal 54 will open so that battery power is supplied to the constant voltage circuit 25 through a diode 55. In all other regards, this embodiment is the same as that previously described and further description is believed to be unnecessary for that reason.

It should be readily apparent from the foregoing description that the embodiments disclosed provide a very effective tachometer that can be utilized in conjunction with engines that do not have an external power source such as a battery or those which have external power sources such as batteries. In addition, the device will be operative so as to minimize noise generated to other electrical circuits. Although two embodiments of the invention have been illustrated and described, various changes and modifications may be made without departing from the spirit and scope of the invention, as defined by the appended claims.

I claim:

1. A tachometer system of an internal combustion engine adapted to be powered by either a battery or a generating coil of an ignition system of said engine and driven by the engine, said system comprising a signal detecting circuit portion for receiving signals from said ignition system of the engine to provide an engine speed signal, a speed indicating circuit portion for receiving said engine speed signal and providing an engine speed indication, a constant voltage portion for providing a source of constant voltage to at least one for said circuit portions, and switch means for selectively coupling said constant voltage portion to said ignition system generating coil when said system is not powered by a battery or to a battery if available for deriving the electrical power to drive said tachometer from either said ignition system generating coil or said battery.

2. A tachometer system as set forth in claim 1 wherein the constant voltage portion provides a source of constant voltage to both the speed detecting circuit portion and the speed indicating circuit portion.

3. A tachometer system as set forth in claim 1 wherein the tachometer has a first terminal adapted to be connected to the generating coil and a second terminal adapted to be connected to a battery, if available, and wherein the switch means is in circuit between the terminals.

4. A tachometer system as set forth in claim 3 wherein the constant voltage portion provides a source of constant voltage to both the speed detecting circuit portion and the speed indicating circuit portion.

5. A tachometer system as set forth in claim 4 wherein the switch means is a solenoid operated switch that is normally closed and which opens automatically upon the application of battery power to the terminal.

* * * * *